Figure 1:
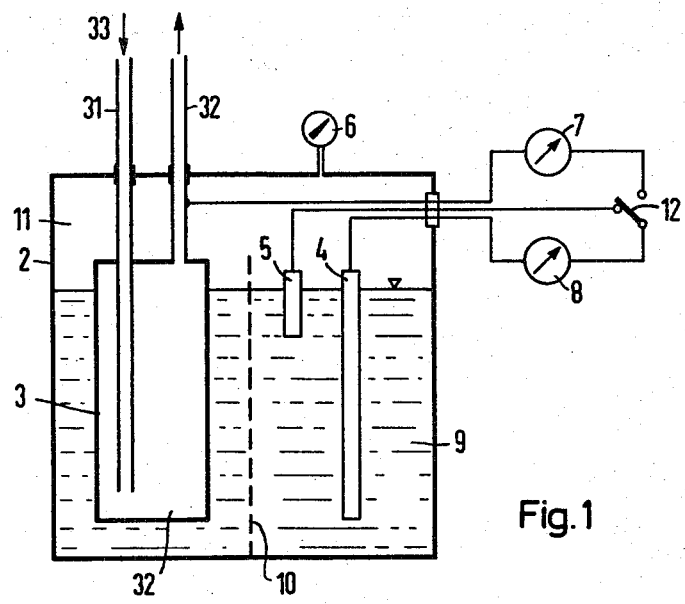

United States Patent
Hofer

[11] 3,855,082
[45] Dec. 17, 1974

[54] METHOD FOR MEASURING THE CHEMICAL CARBON AND/OR NITROGEN ACTIVITIES IN LIQUID METALS

[75] Inventor: Gerhard Hofer, Rottenbach, Germany

[73] Assignee: Siemens Aktiengesellschaft, Berlin and Munich, Germany

[22] Filed: Feb. 26, 1971

[21] Appl. No.: 119,156

[30] Foreign Application Priority Data
Mar. 4, 1970  Germany............................ 2010056

[52] U.S. Cl.............................. 204/1 T, 204/195 R
[51] Int. Cl. ............................................ G01n 27/46
[58] Field of Search.............. 204/1 T, 195 R, 195 S

[56] References Cited
UNITED STATES PATENTS

| | | | |
|---|---|---|---|
| 2,939,827 | 6/1960 | Jacobson et al. ................ | 204/195 R |
| 3,481,855 | 12/1969 | Kolodney et al. ................ | 204/195 S |
| 3,523,066 | 8/1970 | Morris et al.......................... | 204/1 T |
| 3,565,769 | 2/1971 | Holden et al. .................. | 204/195 R |
| 3,598,711 | 8/1971 | Flais ................................ | 204/195 S |

*Primary Examiner*—T. Yung
*Attorney, Agent, or Firm*—Herbert L. Lerner

[57] ABSTRACT

The chemical activities of carbon and/or nitrogen in liquid metal, such as in metallic coolants for nuclear reactors, are measured with the aid of a galvanic cell whose electrolyte contains the same (carbon and/or nitrogen) substance. The liquid metal is passed through a hollow measuring electrode of the galvanic cell so that the share of the carbon and/or nitrogen in the liquid metal is brought substantially in equilibrium by diffusion with the electrode material. The electrical potential difference between the measuring electrode and a reference electrode of the same cell is measured, and the measured value is indicative of the activity difference between the two electrodes and hence indirectly also of the activity to be determined.

2 Claims, 2 Drawing Figures

METHOD FOR MEASURING THE CHEMICAL CARBON AND/OR NITROGEN ACTIVITIES IN LIQUID METALS

My invention relates to method and apparatus for ascertaining and measuring the chemical carbon and/or nitrogen activities in liquid metals such as those used for the cooling of nuclear reactors and other systems that generate large quantities of heat. More specifically, my invention relates to method and apparatus in which the desired detection or measurement is effected with the aid of a galvanic cell whose electrodes have different carbon or nitrogen activities respectively and whose electrolyte contains the same carbon or nitrogen substance at the same temperature level as that of the electrodes.

With nuclear reactors of extremely high energy densities, for example for rapid nuclear reactors, the dissipation of the liberated heat energy with the aid of normal reactor coolants, for example water, is virtually no longer feasible. In such cases, liquid metals, for example sodium or a mixture of sodium with potassium, have been found well suitable as heat carriers especially since the required operating pressure of this working medium amounts to but a few atmospheres and consequently is extremely slight in comparison with water. The operating temperature of such metallic coolants is in the order of magnitude of 600° to 750°C. A main criterion when developing such a reactor, therefore, is the compatibility of the coolant with the materials employed. The coolant in some cases may contain dissolved carbon and also nitrogen. A decarbonization reduces the mechanical strength. An increase in carbonization, however, promotes the embrittlement of steel and other resistant material, especially also of the thin fuel rod envelope tubes of nuclear reactors. A continuous supervision of the carbon content in the coolant affords the supervision and detection of such phenomena. In addition, an increased carbon content may also result in ingress or breakthrough of oil into the liquid-metal circulation. The supervision of the carbon content, therefore, is an urgent requirement for reasons of safety. For solving this problem, several possibilities have already become known. Note, for example, the report "Carbon Meter for Sodium" TID-4500 of the United Nuclear Corporation, published 1966. The proposed device according to this publication comprises a thin-walled metal tube which is immersed into the sodium current. A gas is passed through this tube and subsequently through a gas analyzing apparatus which may be located at a remote location. At the high temperatures of the sodium which are in the order of 600° to 750°C, the carbon dissolved in the sodium diffuses through the wall of the tube and reacts with the gas flowing through the tube. The continuously measurable carbon content of the gas current then constitutes a measure for the carbon activity or the carbon content of the sodium. Such a device, of course, operates better with a high carbon content of the sodium. For slight carbon contents, however, the indication is very inaccurate.

It has further become known to measure the carbon activity of molten iron with the aid of galvanic cells in which the two electrodes consist of molten iron of respectively different carbon activities while the electrolyte consists of a molten slag. With an increase in activities within such a system, the potential difference measured between the electrodes increases. The sensitivity of this system thus increases with declining carbon activities of one of the electrodes. Such a device is described in the paper of Sanbongi and Ohtani, "The Activity of Carbon in Molten Iron," published in Sci. Report Res. Inst. Tohoku University, Series A 5 (1953), pages 263–270. A prerequisite of this measuring method is that electrolyte and electrode material cannot mix with each other which would falsify the result.

Based upon this state of the art it is an object of my invention to devise a method and apparatus for measuring the chemical carbon activities and if desired also the nitrogen activities in liquid metals, that does not entail the above-described disadvantages and that, above all, also exhibits an increase in measuring sensitivity toward reduced carbon or nitrogen activities. Nitrogen activities may result in gas to break into the coolant on account of mechanical damage; the recognition of nitrogen activities, therefore, may serve to detect such damage or the tendency toward such damage.

To achieve these objects, and in accordance with a feature of my invention, I pass the liquid metal through a hollow measuring electrode. The liquid metal brings its carbon and/or nitrogen content by diffusion into substantial equilibrium with the corresponding substance in the electrode material. I further measure the potential difference between the measuring electrode and the second electrode called reference electrode. This potential is a measure of the difference between the carbon or nitrogen activities in the two electrodes and thus indirectly also of the liquid metal, the result being obtained on a virtually currentless principle.

By virtue of the fact that the potential difference is measured in known manner on the currentless principle, the secondary effects within the galvanic cell are avoided.

According to another feature of my invention, it is preferable to provide this galvanic cell with a third electrode for supervisory purposes, the carbon or nitrogen activities of the third electrode being known. By measuring the potential difference between the supervisory electrode and the reference electrode, the operability of the cell, particularly the proper functioning of the electrolyte, can be ascertained. The potential difference between supervisory and reference electrode must not change during the measuring operation proper.

The difficulties of the direct contact between the liquid metal and the electrolyte, having the same temperature, are obviated by the method of the invention in that the liquid metal is passed through the interior of the one electrode while the nitrogen from the liquid metal diffuses into the material of the electrode until a state of equilibrium has been reached. Consequently, only the potential difference between the electrode material and the reference electrode is measured. However, since the potential difference increases with an increase in the difference between the activities of the two electrodes, the measuring sensitivity increases with decreasing carbon or nitrogen content of the measuring electrode and hence of the liquid-metal current. Since further the measuring electrode is continuously traversed by the flow of liquid metal, the method affords a continuous supervision of the carbon or nitrogen activity of the liquid metal. Particular attention should be given to the fact that the indication of the measuring value, being purely of electrical character, is completely independent of the mounting location of the galvanic cell which may possibly be located in the radiation range of the reactor.

Figure 2:
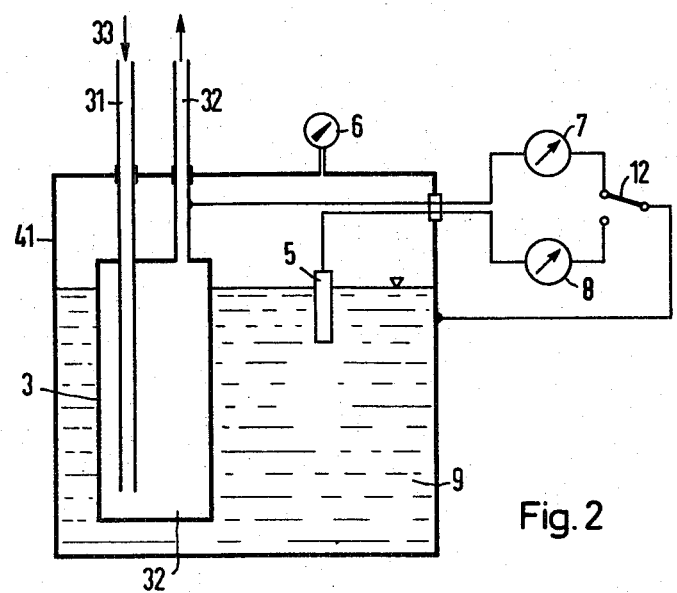

The invention will be further elucidated with reference to apparatus illustrated by way of example on the accompanying drawing in which:

FIG. 1 shows schematically and in section a complete galvanic measuring cell for performing the above-described method; and FIG. 2 shows similarly a modification of such apparatus, the same reference numerals being used in both illustrations for corresponding items respectively.

In the embodiment according to FIG. 1, the galvanic cell is accommodated within a container 2 of material not attacked by the electrolyte, this material being nickel, for example. The measuring electrode 3 consists of a capsule, for example of high-purity iron, which is supplied with liquid metal through line 31 and discharged through line 32. The liquid metal completely fills the interior space of the capsule 3. The reference electrode 4 may consist, for example, of graphite. Applicable, however, are carbon-containing metal alloys whose carbon activity is precisely known. Especially suitable are iron alloys which, aside from carbon, contain chromium and/or nickel with a content of less than 20 percent by weight of these additional metals counted individually or conjointly. The supervisory electrode 5 may be made of the same materials. However, it is to possess a measurable EMF relative to the reference electrode. In the event the reference electrode 4 consists of graphite, it is advisable to place a filter 10, for example of nickel mesh, opposite the measuring electrode 3. The filter serves the purpose of retaining any graphite particles that might become loosened from the electrode 4 or 5. If the electrodes 4 and 5 are made of metallic materials, the use of the filter 10 is unnecessary.

The mentioned electrodes are immersed within the container 2 in the electrolyte 9. This electrolyte consists of molten salt having a temperature of 400°C. The limitation of the working temperature downwardly is advisable in order to afford the above-described carbon diffusion from the liquid metal 33 into the capsule material 3 to a sufficient extent. The molten salt electrolyte may consist, for example, of the following compositions.

$CaCl_2$—$CaC_2$
$CaCl_2$—$NaCl$—$CaC_2$
$CaCl_2$—$LiCl$—$CaC_2$
$NaCl$—$Na_2C_2$
$NaCl$—$KCl\cdot CdCl_2$—$Na_2C_2$
$CaCl_2$—$NaCl$—$KCl\cdot CdCl_2$—$CaC_2$
$NaBr$—$CdBr_2$—$Na_2C_2$
$CaBr_2$—$NaBr$—$CdBr_2$—$CaC_2$
$NaBr$—$MgBr_2$—$Na_2C_2$
$CaBr_2$—$NaBr$—$MgBr$—$CaC_2$ The amount of carbide in each case is 5 to 10 mol-%. Of course, other molten-salt electrolytes with a carbon or carbon-ion content may be used. The operability and quality of the electrolyte 9 is superivsed by the electrode 5 whose EMF is supervised with the aid of the measuring instrument 8. The difference in activities between the measuring electrode 3 and hence of the liquid metal 33 under observation as compared with the reference electrode 4 is indicated by a measuring instrument 7. This instrument may be connected in a manner not illustrated with warning devices which automatically respond in the event of irregularities of the carbon content in the liquid metal 33 being under observation. The instruments 7 and 8 are connected through a selector switch 12 with the reference electrode 4.

Situated above the level of the electrolyte 10 is a protective gas cushion 11 whose pressure is monitored by the manometer 6. This manometer permits the immediate recognition of possible porosities in the lines 31 or 32 or in the measuring electrode 3.

FIG. 2 shows a similar galvanic cell. Here the container 2 is replaced by the reference electrode 41 constructed as a container. The latter comprises one of the aforeindicated materials, not graphite, so that the installation of a filter 10 can be eliminated in this example. The remaining components of this cell have been provided with corresponding, equal reference numerals; their mode of operation is also the same. This mode of operation will be briefly summarized in the following.

The liquid metal 33 passes through a hollow capsule-shaped measuring electrode 3. An equilibrium of carbon activities is obtained between the material of said capsule and the liquid metal 33 which may constitute sodium or a sodium-potassium alloy. Also, an equilibrium of the carbon activities is obtained between the capsule's inner and outer wall. The galvanic EMF between the reference electrode and the measuring electrode results through the difference of the bilateral carbon activities and is measured with a measuring instrument having the best possible internal resistance, that is virtually currentless. The operational temperature and thus, the selection of the fusion electrolyte will normally depend on the temperature of the liquid metal 33 under observation. The heating device of the container which is necessary for maintaining the temperature of the electrolyte, as well as the required device which regulates the temperature, were omitted for better clarity. Furthermore, this has no connection with the object of the invention. The EMF of such cells is between 0 and about 900 mV. The response time during the variation of the carbon content in the liquid metal being supervised is below 2 minutes. For the afore-indicated reasons, the response time will be the lower, the higher the operational temperature of this cell will be selected. It should be pointed out in this connection that for the supervision of the carbon or nitrogen content in the liquid metal, firstly its change according to time and, secondly its absolute value are of importance.

The measurement of the nitrogen activities is effected in an analogous manner. The electrolyte may be a $CaCl_2$ melt with some percentage of $Ca_3N_2$. Its melting point may be reduced by adding further chlorides such as NaCl, LiCl, KCl, $CdCl_2$. In a similar manner, the electrolytes may also be built up of bromides whereto nitrogen ions were added, as $Ca_3N_2$. The reference electrode may be nitrogen gas electrode or a nitrogen compound, whose thermodynamic data are known, for example AlN, BN, CrN, HfN, NbN, ZrN or an iron nitrogen alloy with a known nitrogen activity.

To supervise liquid metal cycles, two devices respectively may be provided for measuring the carbon or the nitrogen activity. However, the measured activities need not necessarily correspond directly to the carbon- or nitrogen content, as the activities of several materials may influence each other. This does not constitute a disadvantage since the transport behavior of the carbon or nitrogen content of liquid metals depends substantially only on the activities of these elements.

I claim:

1. The method of determining the chemical activities of carbon and /or nitrogen, in liquid metal, such as in metallic coolants for nuclear reactors, with the aid of galvanic cells having an electrolyte connecting several electrodes; said method comprising the steps of: flowing said liquid metal through a measuring electrode disposed in a container and immersed in said electrolyte whereby the carbon and/or nitrogen content of said liquid metal is brought by diffusion into substantial equilibrium with that of the measuring electrode material; measuring the electrical potential difference between said measuring electrode and a reference electrode immersed in said electrolyte; measuring the electrical potential difference between a control electrode similarly immersed in said electroyte, and said reference electrode; and evaluating said potential differences as a measure of the activity differences in said respective electrodes and hence indirectly also of the liquid metal and said electrolyte in a virtually currentless manner.

2. The saftey method for monitoring liquid-metal circulation, such as in nuclear reactor plants, for ingress of oil or nitrogen and for detecting undue change in carbonization of steel components by indicating means having several electrodes bridged by an electrolyte, comprising the steps of: measuring the chemical activities of at least one of the substances, carbon and/or nitrogen, in the circulating liquid metal by passing said liquid metal through a mesuring electrode disposed in a container and immersed in said electrolyte whereby the carbon and/or nitrogen content of said liquid metal is brought by diffusion into substantial equilibrium with that of the measuring electrode material; measuring the electrical potential difference between said measuring electrode and a reference electrode immersed in said electrolyte; measuring the electrical potential difference between a control electrode similarly immersed in said electrolyte, and said reference electrode; and evaluating said potential differences as a measure of the activity differences in said respective electrodes and said electrolyte, and hence indirectly also of the safety condition to be supervised.

* * * * *